United States Patent
Maroju et al.

(10) Patent No.: US 11,022,517 B2
(45) Date of Patent: Jun. 1, 2021

(54) LEAK DETECTION FOR AIRCRAFT

(71) Applicant: Goodrich Corporation, Charlotte, NC (US)

(72) Inventors: Sathyanand Maroju, Hyderabad (IN); Sanith Kurumpilavu Subramanian, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 50 days.

(21) Appl. No.: 16/454,803

(22) Filed: Jun. 27, 2019

(65) Prior Publication Data
US 2020/0326259 A1    Oct. 15, 2020

(30) Foreign Application Priority Data
Apr. 12, 2019    (IN) .............................. 201911014869

(51) Int. Cl.
| | |
|---|---|
| *G05D 7/06* | (2006.01) |
| *G01M 3/28* | (2006.01) |
| *B64F 5/60* | (2017.01) |

(52) U.S. Cl.
CPC ............. *G01M 3/2815* (2013.01); *B64F 5/60* (2017.01); *G05D 7/0635* (2013.01);
(Continued)

(58) Field of Classification Search
CPC ........... Y10T 137/0452; Y10T 137/776; Y10T 137/7759; F16K 37/0041; G01M 3/2815; G05D 7/0635; B64F 5/60
See application file for complete search history.

(56) References Cited

U.S. PATENT DOCUMENTS

| | | | | |
|---|---|---|---|---|
| 2,991,481 A | * | 7/1961 | Book | F16K 31/02 4/553 |
| 5,004,014 A | * | 4/1991 | Bender | E03B 7/071 137/624.12 |

(Continued)

FOREIGN PATENT DOCUMENTS

| | | | | |
|---|---|---|---|---|
| EP | 0089563 A2 | * | 9/1983 | ......... F16K 37/0041 |
| EP | 2452875 A2 | | 5/2012 | |

(Continued)

OTHER PUBLICATIONS

EP Search Report; Application No. 20169476.7-1010; dated Oct. 16, 2020; 4 pages.

*Primary Examiner* — Umashankar Venkatesan
(74) *Attorney, Agent, or Firm* — Cantor Colburn LLP (57) ABSTRACT

Disclosed is a sensor system for retrofitting a water supply of an airplane to detect leakage. The system includes a housing having a first band with an inner diameter sized to receive a necked portion of a valve for consumer access to the water supply. The system includes a first transducer disposed on the first band operable to provide a position measurement corresponding to a relative position between a head of the valve and the necked portion. The system includes a second transducer operable to provide a pressure measurement corresponding to a pressure of a compressed gas in a water tank of the water supply. The system includes a controller having input channels operable to receive the position measurement and the pressure measurement. The controller is operable to indicate a leak condition.

15 Claims, 5 Drawing Sheets

(52) U.S. Cl.
CPC ...... *Y10T 137/0452* (2015.04); *Y10T 137/776* (2015.04); *Y10T 137/7759* (2015.04)

(56) References Cited

U.S. PATENT DOCUMENTS

| | | | | |
|---|---|---|---|---|
| 5,161,563 | A | * | 11/1992 | Thompson .............. E03B 7/071 137/1 |
| 5,441,070 | A | * | 8/1995 | Thompson .............. E03B 7/071 137/1 |
| 5,568,825 | A | * | 10/1996 | Faulk ...................... E03B 7/071 137/624.11 |
| 2004/0011408 | A1 | * | 1/2004 | Campbell ........... F16K 37/0041 137/554 |
| 2004/0249583 | A1 | * | 12/2004 | Eryurek .............. G01F 25/0007 702/47 |
| 2005/0067049 | A1 | * | 3/2005 | Fima .................... G01M 3/186 141/192 |
| 2006/0260691 | A1 | * | 11/2006 | Davidoff ............ G01M 3/2815 137/487.5 |
| 2007/0068225 | A1 | * | 3/2007 | Brown ................ G01M 3/2876 73/40.5 A |
| 2016/0282219 | A1 | | 9/2016 | Kinoshita et al. |
| 2017/0346651 | A1 | | 11/2017 | Somajini |
| 2018/0023275 | A1 | | 1/2018 | Getmann et al. |
| 2018/0029708 | A1 | | 2/2018 | Holmes et al. |
| 2018/0127957 | A1 | * | 5/2018 | Enev ....................... E03B 7/003 |
| 2019/0003916 | A1 | * | 1/2019 | Ando .................. G01M 3/2815 |

FOREIGN PATENT DOCUMENTS

| | | | |
|---|---|---|---|
| EP | 3239682 | A1 | 11/2017 |
| WO | 0066431 | A1 | 11/2000 |
| WO | 2014029699 | A1 | 2/2014 |

\* cited by examiner

FIG. 1

PRIOR ART

LEAK DETECTION FOR AIRCRAFT

CROSS REFERENCE TO RELATED APPLICATIONS

This application claims the benefit of Indian Application No. 201911014869, filed Apr. 12, 2019, which is incorporated by reference in its entirety herein.

BACKGROUND

Exemplary embodiments pertain to the art of water systems for aircraft. The addition of potable water supplies to aircraft provides basic necessities to occupants while imposing challenges that may lead to delay and cancellation of travel. A leak in the potable water supply may require operator actions, or if left unmitigated or undetected, the grounding of flights.

BRIEF DESCRIPTION

Disclosed is a sensor system for retrofitting a water supply of an airplane to detect leakage. The system includes a housing including a first band having an inner diameter sized to receive a necked portion of a valve for consumer access to the water supply. The system includes a first transducer disposed on the first band operable to provide a position measurement corresponding to a relative position between a head of the valve and the necked portion. The system includes a second transducer operable to provide a pressure measurement corresponding to a pressure of a compressed gas in a water tank of the water supply. The system includes a controller having input channels operable to receive the position measurement and the pressure measurement, the controller operable to, when the pressure measurement indicates a pressure decrease and the position measurement indicates a closed valve position that prevents water flow, indicate a leak condition.

In addition to one or more of the features described above, or as an alternative, further embodiments may include that a third transducer operable to provide outlet flow measurement corresponding to an outlet flow from the water tank, and the controller having an third transducer input channel operable to receive the flow measurement, and responsive to the outlet flow measurement having a value greater than a predetermined flow rate of the valve, indicate the leak condition.

In addition to one or more of the features described above, or as an alternative, further embodiments may include that a fourth transducer operable to provide downstream flow measurement corresponding to a downstream flow from a joint connected to the valve, and the controller having a fourth transducer input channel operable to receive the downstream flow measurement, and responsive to the downstream flow measurement having a different value than a sum of the outlet flow measurement and a premeasured flow rate corresponding to the valve, indicate the leak condition.

In addition to one or more of the features described above, or as an alternative, further embodiments may include that the leak condition includes a location associated with the downstream flow measurement.

In addition to one or more of the features described above, or as an alternative, further embodiments may include that the first transducer is a limit switch.

In addition to one or more of the features described above, or as an alternative, further embodiments may include that the second transducer is a differential pressure sensor.

In addition to one or more of the features described above, or as an alternative, further embodiments may include that the first band defines two jaws arranged to meet in a secured position around the necked portion, the two jaws having respective apertures sized to receive a set screw.

In addition to one or more of the features described above, or as an alternative, further embodiments may include that the housing includes a second band sized to receive the necked portion and a transducer terminal supported by the second band electrically connected with the first transducer.

In addition to one or more of the features described above, or as an alternative, further embodiments may include that the housing includes a conduit between the first band and the second band sized to house wire that electrically connects the first transducer and the transducer terminal.

In addition to one or more of the features described above, or as an alternative, further embodiments may include that the transducer terminal includes a wireless antenna operable to send the position measurement to the controller.

In addition to one or more of the features described above, or as an alternative, further embodiments may include that a stop valve operable to stop a flow path of the water supply responsive to the leak condition.

In addition to one or more of the features described above, or as an alternative, further embodiments may include that the leak condition is a control signal for the stop valve.

Also disclosed is a method for detecting a leak in a water supply of an airplane. The method includes receiving a position measurement corresponding to a valve position between a head of a valve and a necked portion of the valve from a first transducer measuring the valve position. The method includes receiving a pressure measurement corresponding to a pressure of a compressed gas in a water tank of the water supply. The method includes outputting a leak condition when the pressure measurement indicates a pressure decrease and the position measurement indicates a closed valve position that prevents water flow.

In addition to one or more of the features described above, or as an alternative, further embodiments may include operating a stop valve associated with the water supply to prevent water flow of the water supply.

In addition to one or more of the features described above, or as an alternative, further embodiments may include that the leak condition includes a location of associated with the leak condition.

In addition to one or more of the features described above, or as an alternative, further embodiments may include that the stop valve is associated with the location of the leak condition such that only waterflow associated with the leak condition.

In addition to one or more of the features described above, or as an alternative, further embodiments may include receiving an outlet flow measurement corresponding to an outlet flow from the water tank, and outputting the leak condition when the outlet flow measurement has a value greater than a predetermined flow rate of the valve.

In addition to one or more of the features described above, or as an alternative, further embodiments may include receiving downstream flow measurement corresponding to a downstream flow from a joint connected to the valve, and outputting the downstream flow measurement having a different value than a sum of the outlet flow measurement and a premeasured flow rate corresponding to the valve.

Also disclosed is a sensor system for retrofitting a water supply of an airplane to detect leakage. The system includes a housing including a first band having an inner diameter sized to receive a necked portion of a valve for consumer access to the water supply. The system includes a first transducer disposed on the first band operable to provide a position measurement corresponding to a relative position between a head of the valve and the necked portion. The system includes a second transducer operable to provide a pressure measurement corresponding to a pressure of a compressed gas in a water tank of the water supply. The system includes a controller having input channels operable to receive the position measurement and the pressure measurement. The controller is operable to, when the pressure measurement indicates a pressure decrease and the position measurement indicates a closed valve position that prevents water flow, operate a stop valve associated with the water supply.

In addition to one or more of the features described above, or as an alternative, further embodiments may include that the housing includes a second band sized to receive the necked portion and a transducer terminal supported by the second band electrically connected with the first transducer, the transducer terminal having a wireless antenna operable to send the position measurement to the controller.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Detection of aircraft leaks may provide aircraft operators with indication of transient aircraft conditions and automatic isolation. Leak detection may be performed inferentially. As one non-limiting example, indication of the operational status of all water supply system exits provides an indication of the desired fluid flows from the system. Comparing exit status with a measurement of water source status provides indication of the potential leaks in the water supply system. Water supply exits may be retrofitted to provide indications to controllers similarly receiving water flow indications from the water supply sources. To provide a more specific indication, water flow sensors may be disposed near junctions of the water supply to determine which segment of the aircraft water supply has a leak.

Figure 1:
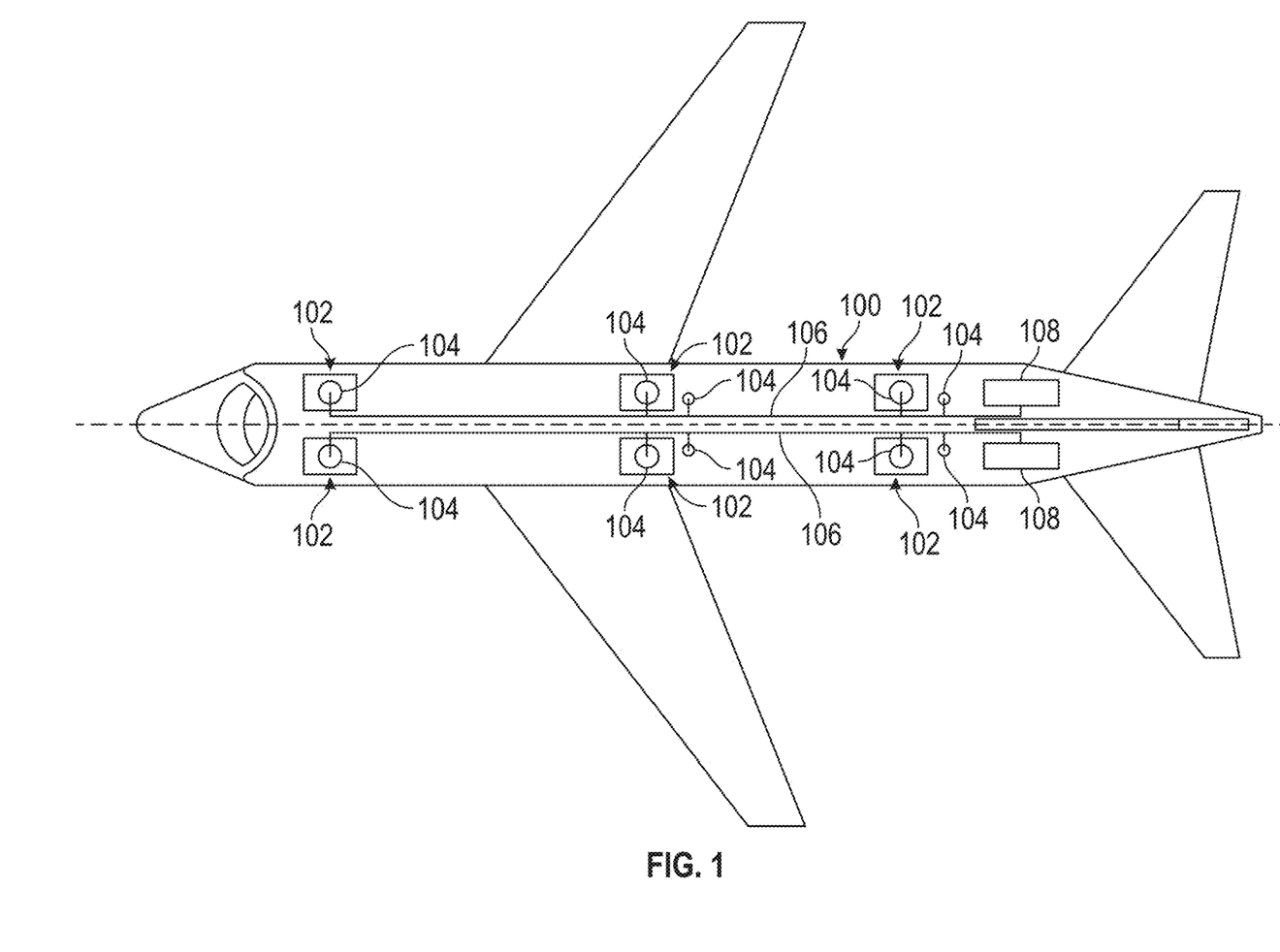
FIG. 1 is a schematic of an aircraft having a water supply.

Referring to FIG. 1, a schematic for an aircraft 100 is shown. The aircraft 100 includes cockpit, fuselage, and tail portions. Throughout the aircraft 100 are lavatories and other compartments 102 that include valves 104 for consumer access to a water supply 106 that includes water tanks 108. As shown, the water supply 106 includes pipes, ducts, hoses, or other conduits for providing consumers with access to water or other fluids.

Figure 2:
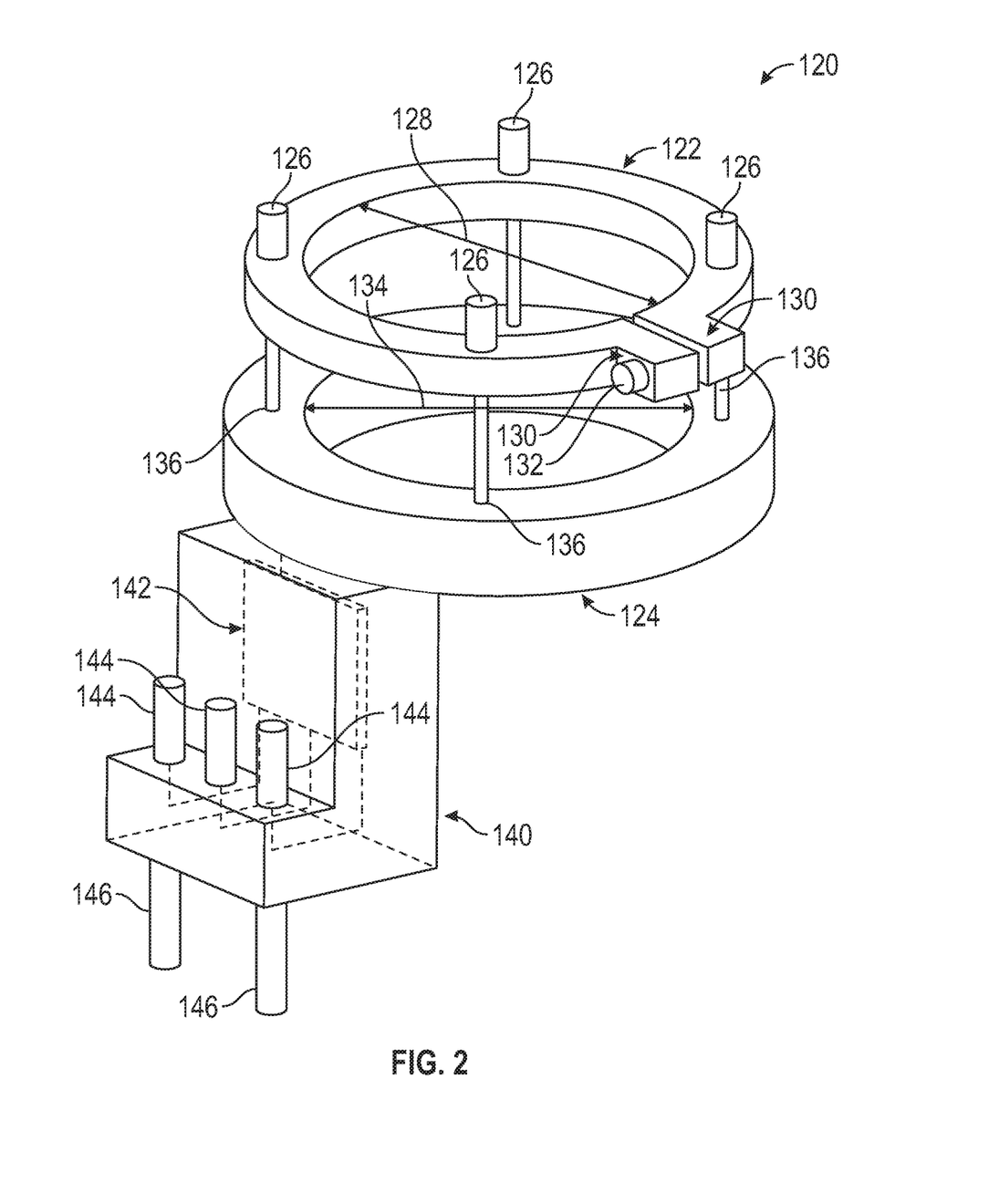
FIG. 2 is a is a perspective view of a housing for monitoring a position of a valve head.

FIG. 2 includes a prospective view of a housing 120 for a valve 104. The housing 120 may be retrofitted to preexisting valves 104. That is, manufactured aircraft 100 or installed valves 104 may be modified with leak detection mechanisms described herein. The housing 120 includes a first band 122 has an inner diameter 128 sized to receive a valve 104. The valve 104 may be a push tap type valve 104 or any other type of valve 104. A push tap type valve 104 is biased to the closed position and requires compression to open. The first band 122 is configured to secure a transducer 126 to a portion of the valve 104 through a compression or interference mechanism 130. Any type of implement may affix the housing 120 to the valve 104. That is, the compression or interference mechanism 130 may be any type of fastener or fastening mechanism (e.g., magnetic, adhesive, compression, anchor). As shown, the fastening mechanism 130 includes a nut and bolt configuration 132 to compress a portion of the valve 104 with the inner diameter 128.

The transducers 126 may be any kind of sensing mechanism. For example, the transducer 126 may be a limit switch, electrical contactor, magnetic sensor, inductive sensor, capacitive sensor, or any other type of sensor configured to recognize proximity of the valve components. The housing 120 may include a second band 124 secured to the first band 122 with conduits 136. The conduits may serve as guides for the transducer communications cabling or provide structural support. The second band 124 may be sized with an inner diameter 134 to receive the valve 104. The second band 124 may fasten to the valve 104 or simply receive the valve 104 for stabilization. Associated with the first band 122, the second band 124, or both, a transducer terminal 142 supplies propagation of the position indication from the transducer 126. As shown the transducer terminal 142 includes power terminals 146 and transmission terminals 144. The power terminals may be configured to receive alternating or direct current. The transmission terminals may provide connections to a controller through wired or wireless communications. For example, the transmission terminals 144 may be wireless antennae for communication over a wireless medium to a controller or receiver. The transmission terminals 144 may be wired ports for receiving conductive cables connected with a controller or receiver.

Figure 3:
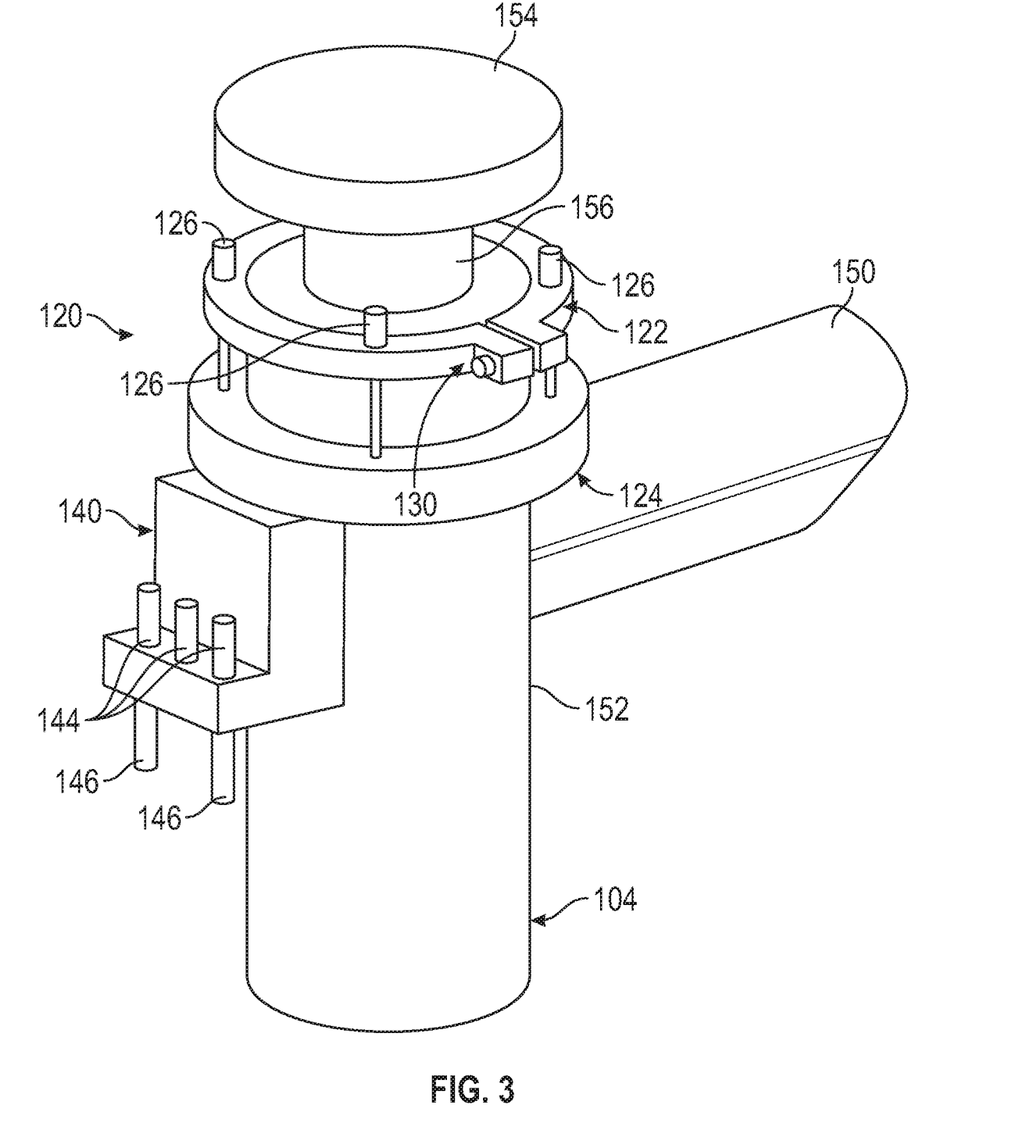
FIG. 3 is a perspective view of a housing retrofitted to a valve.

Referring to FIG. 3, a housing 120 sized to receive a valve 104 is shown. The valve 104 includes a necked portion 152 of a valve body. The valve 104 includes an outlet 150 for distributing liquid according to a position of a valve head 154. The valve 104 includes a valve stem 156 connected to the valve head 154 for communicating a plug position of the valve 104 for controlling the flow of liquid to the outlet 150. It should be appreciated that the valve 104 includes a necked portion 152 that may include portions of the valve stem 156. The housing 120 is configured to receive and couple with necked portions 152 of the valve 104. The fastener 122 or first band 122 may be any type of fastener or fastening system as described or not described above. The set screw or tightening bolt 132 is configured to squeeze jaws 130 of the first band 122 to secure the housing 120 to the necked portion 152 of the valve 104.

Figure 4:
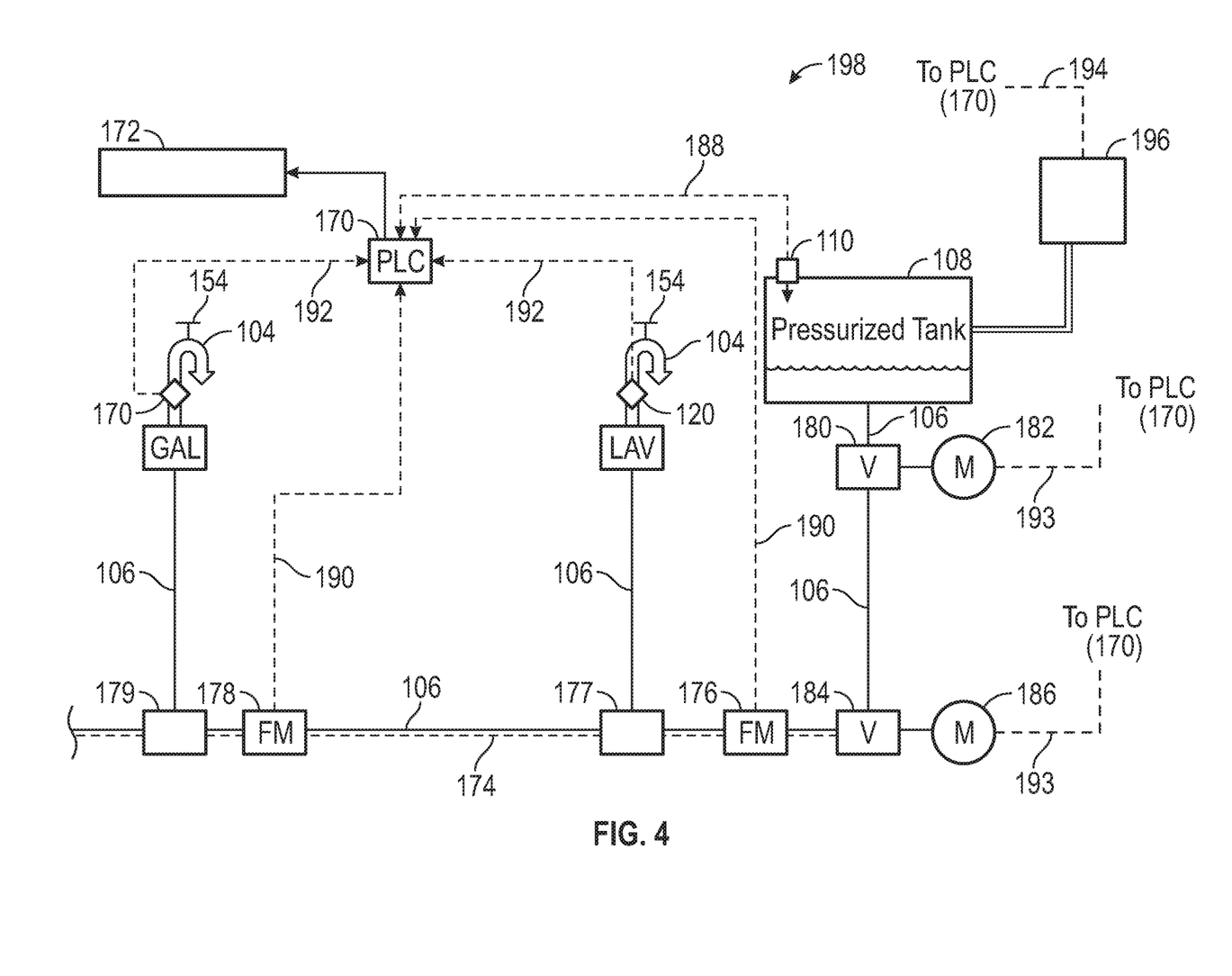
FIG. 4 is a schematic of a leak detection control system of an aircraft water supply.

FIG. 4 includes a schematic of a control system 198. The control system 198 includes a controller 170 for receiving, controlling, and outputting control signals related to the water supply 106. The controller 170 may be a specifically tailored water supply controller or complete aircraft controller. The controller 170 may include any combination of processors, field programmable gate arrays (FPGA), or application specific integrated circuits (ASIC). The controller 170 may include memory, volatile and non-volatile, operable to store machine instructions from the processors and other processing mechanisms to receive, calculate, and control valves and valve information related to the water supply 106.

The controller 170 may be operable to indicate system status on a display 172. The controller 170 may be further configured to operate valves 180, 184 by motor 182, 186 (motor operated valves) through control lines 193, or any other type of fluid control operation. It should be appreciated that any type of wired or wireless configuration is appreciated for any of the control lines disclosed herein. Wireless protocols such as ZIGBEE, WI-FI, or any other implement may be used. Communications may be realized through any protocol or medium known or unknown.

The water supply 106 includes a pressured tank 108. The pressurized tank 108 is connected with a compressor 196. The compressor 196 may be driven by any apparatus, including aircraft propulsion systems. The compressor 196 or compressor outlet may be controlled by the controller 170 based on a transducer 110 operable to provide a pressure measurement 188. The transducer 110 may be any type of transducer configured to provide a pressure measurement 188. For example, the transducer 110 may be a differential pressure transmitter. As such, pressurized water flows from the pressurized tank 108 through the rest of the water supply 106. The water supply 106 may include a shutoff valve 180 that is operated by a motor 182 or another implement. Closure of the shutoff valve 180 prevents outflow from the pressurized tank 108. Additionally, exhaust valve 184 that is operated by a motor 186 may provide depressurization of the water supply 106 or perform other necessary functions during takeoff and landings of the aircraft 100. The motor operated valves 180, 184 are controlled by the controller 170 through control lines 193.

A transducer 176 flow meter may be implemented on the water supply 106 before a junction 177 with one of the valves 104. The junction 177 allows water or another fluid to flow to the outlet valve 104. For example, this outlet valve 104 may be disposed in the lavatory. The flow meters 176, 178 may be any type of flow meter apparatus. For example, the flow meters 176, 178 may be ultrasonic. As a non-limiting example, the flow meters 176, 178 may also be rotameters, variable Area, spring and piston, mass gas, turbine, paddlewheel, positive displacement, vortex, or any other type of implement. Another transducer 178 flow meter may be implemented on the water supply 106 before junction 179 with one of the valves 104. The associated valve 104 may be disposed in a galley of the aircraft 100. The transducers 176, 178, flow meters, may be configured to communicate with the controller 170 through communications channels 190. It should be appreciated that all of the communications channels 188, 190, 192, 193, with the controller 170 may be input channels 188, 190, 192, output channels 193, 194, or a combination thereof. Indeed, the controller 170 is configured to receive and send inputs and outputs among any of the peripheral devices described herein.

Figure 5:
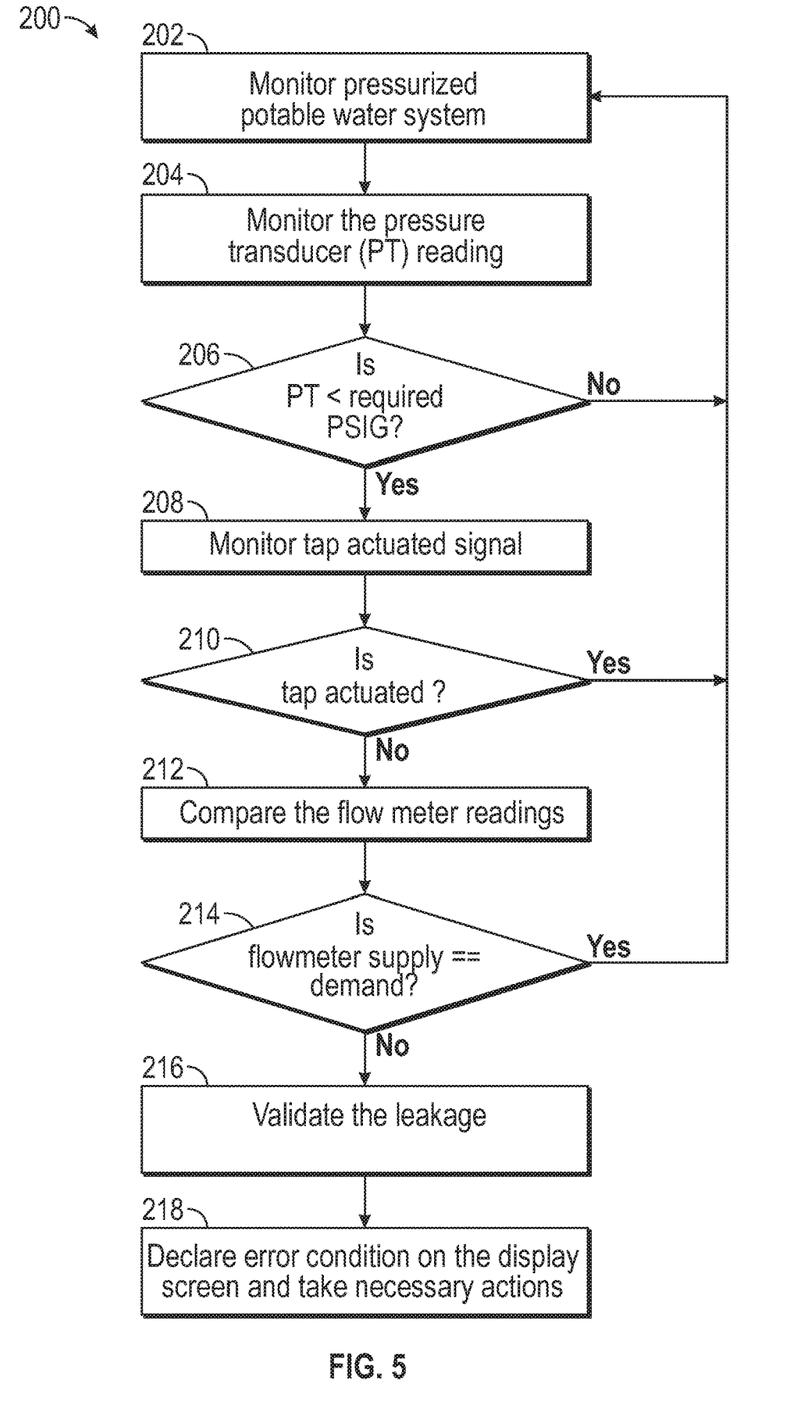
FIG. 5 is an algorithm for leak detection of an aircraft water supply.

Referring to FIG. 5, an algorithm 200 implemented by the controller 170 is shown. The controller 170 may include programming or other control logic to perform leak detection. The logic may be stored in memory of the controller 170. The programming may include receiving the position measurement 192 from one of the valves 104 and the pressure measurement 188 from the pressure transducer 110, in step 202. After receipt, the controller 170 may determine whether water is being evacuated from the pressurized water tank 108 based on a decrease in pressure of the tank 108 in step 204 by monitoring the pressure measurement 188. If the pressure drops below a setpoint of the pressurized water tank or another predetermined value in step 206, the controller 170 will determine whether the valve 104 has a position indication 192 that is closed, based on the position measurement 192 in steps 208, 210. If the controller 170 detects a leak the motor operated valves 180, 184 may be operated, an indication may be displayed on the display 172, or both.

Additionally or individually, the controller 170 may compare position measurement 192 with one or both flow transducers 176, 178. For example, a predetermined flow rate may be associated with each of the retrofitted housings and valves 104. After installation of the retrofitted housing, the valves 104 may be individually and collectively opened and closed for the respective flow meters to establish flow volumes for each of the valves 104 individually and the downstream sections of the valves 104. As an example, the valve 104 associated with junction 177 may be actuated, allowing fluid to exit. The flow meter transducer 176 can be monitored to determine the flow rate through that valve 104. Additionally, the downstream valve 104 associated with junction 179 may be operated to determined flow rates associated with junction 179 and the valve 104. As such, the flow meters may be used to detect system leakage if there are flows when the associated valves 104 and corresponding junctions 177, 179 are closed.

It should be appreciated that the volume flow rate Q for an incompressible fluid at a point along a pipe is the same as the volume flow rate at any other point along such pipe. As such, the volume flow rate through the water supply 106 is equal to the sum of the volume flow rates at each of the outlet valves 104. Therefore, if the total outlet flow from flow transducer 176 is greater than the sum of respective valves 104 that are allowing fluid flow, the controller 170 will indicate a leak. The location of the leak may be pinpointed along the water supply 106 based on the rates 190 from respective flow transducers 176, 178. For example, a leak may be calculated and indicated or controlled by the controller 170 when the valve 104 associated with junction 177 is open, flow transducer 176 has a flow measurement 190 that is greater than the measured outlet flow of the valve 104 associated with the function, the valve associated with junction 179 is closed, and the flow transducer 178 has a flow measurement 190 that is zero. That is, flow transducer supply 176 is not equal to demand as specified in step 214 of algorithm 200. The inequality of step 214 may be validated multiple times or clock cycles. For example, the inequality may be validated three times by the controller 170 in step 216. In step 218, a leak is declared by the controller 170. The leak indication may be presented on the display 172 and the motor operated valves 180, 184 may be closed by the controller 170.

It should be appreciated that any of the steps disclosed may be omitted, rearranged, repeated by the controller 170 and transducers 110, 126, 176, 178. Any or all the steps may be performed by the controller or other controlling components. The controller may be one or more processing units having memory to carry out the algorithm 200.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sensor system for retrofitting a water supply of an airplane to detect leakage, the system comprising:
a housing including a first band having an inner diameter sized to receive a necked portion of a valve for consumer access to the water supply;
a first transducer disposed on the first band operable to provide a position measurement corresponding to a relative position between a head of the valve and the necked portion;
a second transducer operable to provide a pressure measurement corresponding to a pressure of a compressed gas in a water tank of the water supply;
a controller having input channels operable to receive the position measurement and the pressure measurement, the controller operable to, when the pressure measurement indicates a pressure decrease and the position measurement indicates a closed valve position that prevents water flow, indicate a leak condition;
a third transducer operable to provide outlet flow measurement corresponding to an outlet flow from the water tank, and the controller having an third transducer input channel operable to receive the flow measurement, and responsive to the outlet flow measurement having a value greater than a predetermined flow rate of the valve, indicate the leak condition; and
a fourth transducer operable to provide downstream flow measurement corresponding to a downstream flow from a joint connected to the valve, and the controller having a fourth transducer input channel operable to receive the downstream flow measurement, and responsive to the downstream flow measurement having a different value than a sum of the outlet flow measurement and a premeasured flow rate corresponding to the valve, indicate the leak condition.

2. The sensor system of claim 1, wherein the leak condition includes a location associated with the downstream flow measurement.

3. The sensor system of claim 1, wherein the first transducer is a limit switch.

4. The sensor system of claim 1, wherein the second transducer is a differential pressure sensor.

5. The sensor system of claim 1, wherein the first band defines two jaws arranged to meet in a secured position around the necked portion, the two jaws having respective apertures sized to receive a set screw.

6. The sensor system of claim 1 further comprising, a stop valve operable to stop a flow path of the water supply responsive to the leak condition.

7. The sensor system of claim 6, wherein the leak condition is a control signal for the stop valve.

8. A sensor system tor retrofitting a water supply of an airplane to detect leakage, the system comprising:
a housing including a first band having an inner diameter sized to receive a necked portion of a valve for consumer access to the water supply,
a first transducer disposed on the first band operable to provide a position measurement corresponding to a relative position between a head of the valve and the necked portion;
a second transducer operable to provide a pressure measurement corresponding to a pressure of a compressed gas in a water tank of the water supply; and
a controller having input channels operable to receive the position measurement and the pressure measurement, the controller operable to, when the pressure measurement indicates a pressure decrease and the position measurement indicates a closed valve position that prevents water flow, indicate a leak condition;
wherein the housing includes a second band sized to receive the necked portion and a transducer terminal supported by the second band electrically connected with the first transducer.

9. The sensor system of claim 8, wherein the housing includes a conduit between the first band and the second band sized to house wire that electrically connects the first transducer and the transducer terminal.

10. The sensor system of claim 8, wherein the transducer terminal includes a wireless antenna operable to send the position measurement to the controller.

11. A method for detecting a leak in a water supply of an airplane, the method comprising:
receiving a position measurement corresponding to a valve position between ahead of a valve and a necked portion of the valve from a first transducer measuring the valve position;
receiving a pressure measurement corresponding to a pressure of a compressed gas in a water tank of the water supply;
outputting a leak condition when the pressure measurement indicates a pressure decrease and the position measurement indicates a closed valve position that prevents water flow;
receiving an outlet flow measurement corresponding to an outlet flow from the water tank, and outputting the leak condition when the outlet flow measurement has a value greater than a predeterminded flow rate of the valve; and
receiving downstream flow measurement corresponding to a downstream flow from a joint connected to the valve, and outputting the downstream Dow measurement having a different value than a sum of the outlet flow measurement and a premeasured flow rate corresponding to the valve.

12. The method of claim 11 further comprising, operating a stop valve associated with the water supply to prevent water flow of the water supply.

13. The method of claim 12, wherein the leak condition includes a location of associated with the leak condition.

14. The method of claim 13, wherein the stop valve is associated with the location of the leak condition such that only waterflow associated with the leak condition.

15. A sensor system for retrofitting a water supply of an airplane to detect leakage, the system comprising:
- a housing including a first band having an inner diameter sized to receive a necked portion of a valve for consumer access to the water supply;
- a first transducer disposed on the first band operable to provide a position measurement corresponding to a relative position between a head of the valve and the necked portion;
- a second transducer operable to provide a pressure measurement corresponding to a pressure of a compressed gas in a water tank of the water supply; and
- a controller having input channels operable to receive the position measurement and the pressure measurement, the controller operable to, when the pressure measurement indicates a pressure decrease and the position measurement indicates a closed valve position that prevents water flow, operate a stop valve associated with the water supply;
- wherein the housing includes a second band size to receive the necked portion and a transducer terminal supported by the second band electrically connected with the first transducer, the transducer terminal having a wireless antenna operable to send the position measurement to the controller.

* * * * *